United States Patent
St James

(10) Patent No.: US 8,544,917 B2
(45) Date of Patent: Oct. 1, 2013

(54) CAT LITTER SCOOP WITH ADJUSTABLE SCREENS

(76) Inventor: Charles St James, Milford, CT (US)

( * ) Notice: Subject to any disclaimer, the term of this patent is extended or adjusted under 35 U.S.C. 154(b) by 118 days.

(21) Appl. No.: 13/175,470

(22) Filed: Jul. 1, 2011

(65) Prior Publication Data

US 2013/0001965 A1   Jan. 3, 2013

(51) Int. Cl.
A47F 13/08 (2006.01)
(52) U.S. Cl.
USPC .............................. 294/179; 294/1.3; 209/319
(58) Field of Classification Search
USPC ........... 294/1.3, 176, 179; D30/162; 119/166, 119/161, 165, 168; D7/691; 210/488, 489; 43/11, 12, 7, 4, 55; 209/315, 319, 405, 418, 209/419
See application file for complete search history.

(56) References Cited

U.S. PATENT DOCUMENTS

| | | | | |
|---|---|---|---|---|
| 2,853,195 | A * | 9/1958 | Malcolm ........................ | 210/471 |
| 3,822,020 | A * | 7/1974 | Hong ............................ | 210/248 |
| 3,908,597 | A * | 9/1975 | Taylor .......................... | 119/166 |
| 4,043,039 | A * | 8/1977 | Goetze, Jr. ....................... | 30/325 |
| 5,211,133 | A * | 5/1993 | Foley ............................ | 119/166 |
| 5,738,399 | A | 4/1998 | Mitchell | |
| 5,893,336 | A | 4/1999 | Vice et al. | |
| 5,921,596 | A | 7/1999 | Sheriff | |
| 6,234,549 | B1 | 5/2001 | Brownell | |
| 6,312,029 | B1 | 11/2001 | Renforth | |
| 6,925,961 | B2 * | 8/2005 | Langdale ....................... | 119/166 |
| 7,047,907 | B1 | 5/2006 | Johnston | |
| 7,172,229 | B2 | 2/2007 | Gorbet | |
| 7,523,973 | B2 | 4/2009 | Lin et al. | |
| 2003/0121834 | A1 | 7/2003 | Greenberg | |
| 2044/0227354 | | 11/2004 | Pam et al. | |
| 2005/0173935 | A1 | 8/2005 | Pain et al. | |
| 2005/0284392 | A1 | 12/2005 | Hillman | |
| 2006/0156991 | A1 | 7/2006 | Burns et al. | |

* cited by examiner

Primary Examiner — Stephen Vu

(57) ABSTRACT

A cat litter scoop has one or more adjustable screens that adjust the effective opening in a scoop portion of the cat litter scoop. In some embodiments, the cat litter scoop may include two screens, one lying atop the other, wherein at least one of the two screens is adjustable relative to the other. In some embodiments, both screens of the cat litter scoop may be adjustable. In this embodiment, one screen may be adjustable backward and forward and the other screen may be adjustable from side to side, allowing the holes of the screen to become smaller in order to capture the clumps of urine such that they would be removed from the litter material.

11 Claims, 3 Drawing Sheets

CAT LITTER SCOOP WITH ADJUSTABLE SCREENS

BACKGROUND OF THE INVENTION

The present invention relates to cat litter scoops and, more particularly, to cat litter scoops with one or more adjustable screens for sifting and removing small clumps from cat litter.

Conventional cat litter scoops have only one metal or plastic screen. When people sift cat litter boxes using regular and conventional cat litter scoops, often small clumps of urine remain in the litter material. Conventional cat litter scoops may often leave these small clumps, no matter how many times they sift the same litter.

Some cat litter scoops may be made with a smaller mesh to prevent small clumps from passing through, however, such a scoop may not be practical for all brands of cat litter, since some litter may be made with larger or smaller grain sizes. Therefore, a cat litter scoop ideal for one brand of litter may clog with another brand of litter.

As can be seen, there is a need for a cat litter scoop that may include a screen prevents small clumps from falling through the scoop.

SUMMARY OF THE INVENTION

In one aspect of the present invention, a scoop comprises a scoop body; a first screen unit covering an opening in the scoop body; and a second screen unit disposed over the first screen unit, wherein the first screen unit is adjustable relative to the second screen unit.

In another aspect of the present invention, a cat litter scoop comprises a scoop body; a first screen unit covering an opening in the scoop body, the first screen unit movable in a first direction; and a second screen unit disposed over the first screen unit, the second screen unit movable in a second direction, the second direction orthogonal to the first direction.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, an embodiment of the present invention provides a cat litter scoop having one or more adjustable screens that adjusts the effective opening in a scoop portion of the cat litter scoop. In some embodiments, the cat litter scoop may include two screens, one lying atop the other, wherein at least one of the two screens is adjustable relative to the other. In some embodiments, both screens of the cat litter scoop may be adjustable. In this embodiment, one screen may be adjustable backward and forward and the other screen may be adjustable from side to side, allowing the holes of the screen to become smaller in order to capture the clumps of urine such that they would be removed from the litter material.

Figure 1:
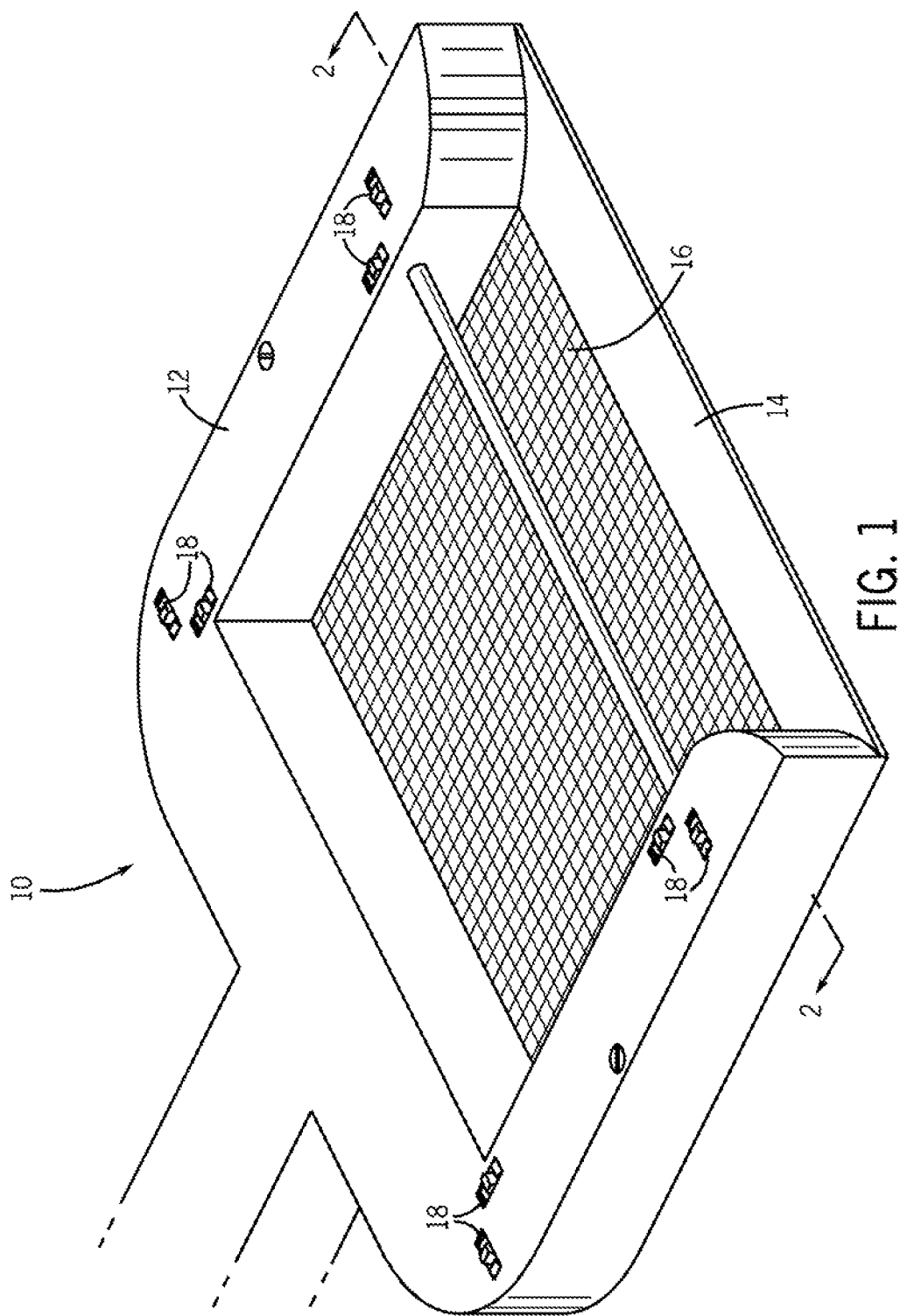
FIG. 1 is a perspective view of a cat litter scoop according to an exemplary embodiment of the present invention.

Referring to FIGS. 1 through 6, a litter scoop 10 may include a top cover 12 that may fit onto a body of the scoop 10. The litter scoop 10 may include a handle (not shown) extending from the top cover 12 and the body 14. The top cover 12 and the body 14 may form a scoop portion of the litter scoop 10. An upper screen unit 16 and a lower screen unit 20 may be disposed to cover an opening in the body 14 of the litter scoop 10. The litter scoop 10 may be designed in a variety of shaped and sizes. For example, the opening of the body 14 may be from about 2 to about 10 inches wide and from about 2 to about 10 inches deep. The scoop portion of the litter scoop 10 may be designed with a flat shape (as shown in FIG. 1) or in a curved shape, creating a pocket for holding clumped litter as it is scooped. In general, the litter scoop 10 may be configured in the sizes and shaped similar to conventional litter scoops. The top cover 12 may be removably attached to the body 14 by, for example, screws, as shown in FIG. 1. The top cover 12 may be removed to allow for removal, cleaning or replacement of the screen units 16, 20.

The upper screen unit 16 may be adjustable relative to the lower screen unit 20. Similarly, the lower screen unit 20 may be adjustable relative to the upper screen unit 16. In some embodiments, one of the upper screen unit 16 and the lower screen unit 20 may be fixed, and only one of the screen units 16, 20 may be adjustable.

The screen units 16, 20 may be adjustable via a variety of mechanisms. In an exemplary embodiment, the upper screen unit 16 may contain linear teeth 22 along its opposite edges. Similarly, the lower screen unit 20 may contain linear teeth 24 along its opposite edges. Cog wheels 18 may be disposed on opposite ends of axles 26 and adapted to engage the linear teeth 22, 24. As shown in FIGS. 1 through 4, a first set of two axles 26 may have cog wheels 18 on their ends adapted to engage the linear teeth 24 of the lower screen unit 20. The cog wheels 18 may be disposed near each corner of the lower screen unit 20. A user may turn these cog wheels 18 to move the lower screen unit from side to side. Similarly, a second set of two axles 26 may have cog wheels 18 on their ends adapted to engage the linear teeth 22 of the upper screen unit 16. The cog wheels 18 may be disposed near each corner of the upper screen unit 16. A user may turn these cog wheels 18 to move the lower screen unit 20 from back to front. In some embodiments, the upper screen unit may be adapted to move from side to side while the upper screen unit 16 may be adapted to move from back to front.

While the above describes two sets of cog wheels 18 on each of the corners of the screen units 16, 20, a single set of two cog wheels 18 on a single axle 26 may be suitable for moving each of the screen units 16, 20.

Figure 2:
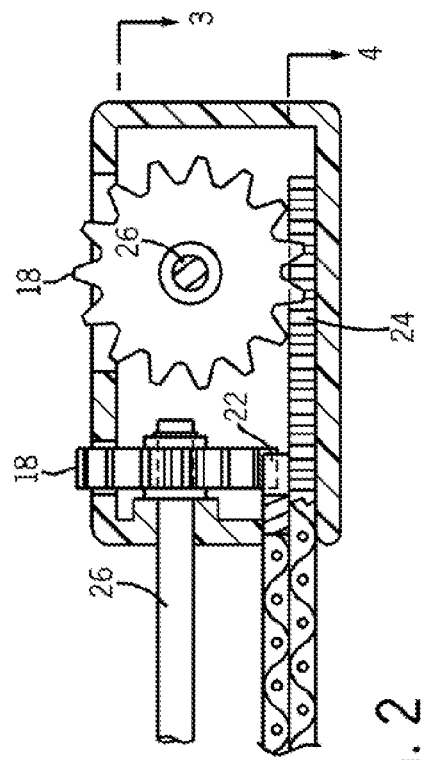
FIG. 2 is a cross-sectional view of the cat litter scoop taken along line 2-2 of FIG. 1.
Figure 2:
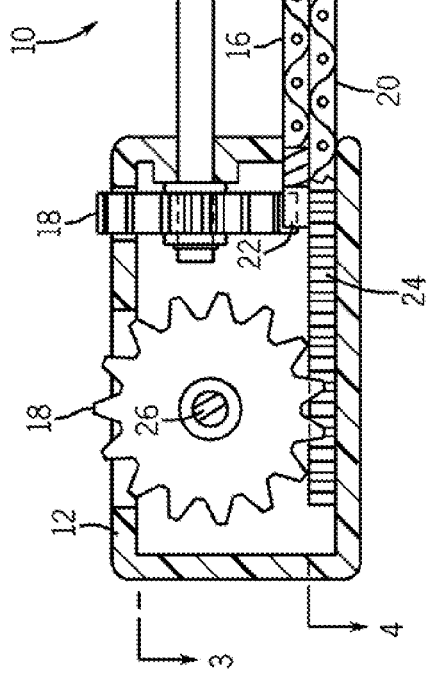

Journals 28 may be disposed in the scoop to rotatably secure the axles 26 there in. In some embodiments, the axles 26 may be secured by the top cover 12, as shown in FIG. 2.

Stops (not shown) may be disposed along the linear teeth 22, 24 to limit the range of adjustment of the screen units 16, 20. The stops may be formed from a plastic or metal guard or may simply result from the termination off the teeth 22, 24. Typically, the stops will allow a screen unit to move a distance of one-half of the size of openings 32, 36 of mesh 30, 34 the screen units 16, 20. This distance may permit the screens to adjust from a maximum size (as shown in FIG. 5, wherein the upper screen unit 16 is directly on top of the lower screen unit 20), to a minimum size, wherein the mesh 30 of the upper screen unit 16 is aligned in the middle of the mesh 34 of the lower screen unit 20.

Figure 5:
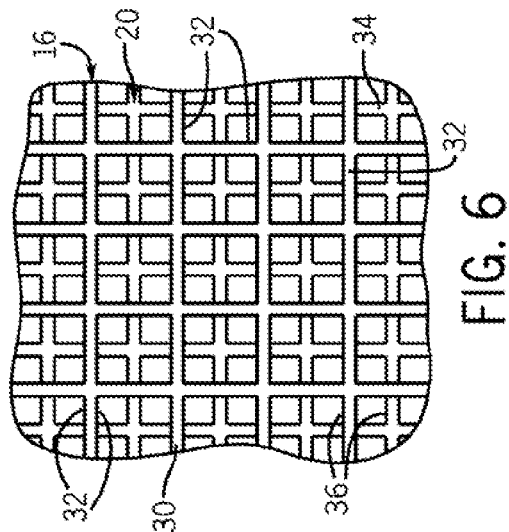
FIG. 5 is a detail plan view of the cat litter scoop indicated by the line 5-5 of FIG. 3.
Figure 6:
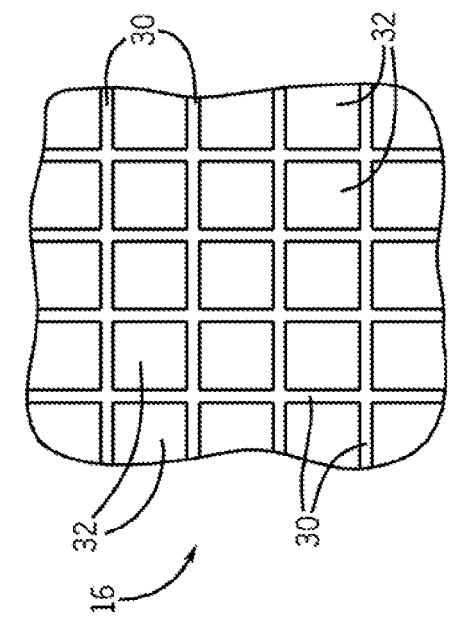
FIG. 6 is a plan view of the cat litter scoop indicated by the line 5-5 of FIG. 3, showing the effect of adjusting the effective opening between the screens.
Figure 3:
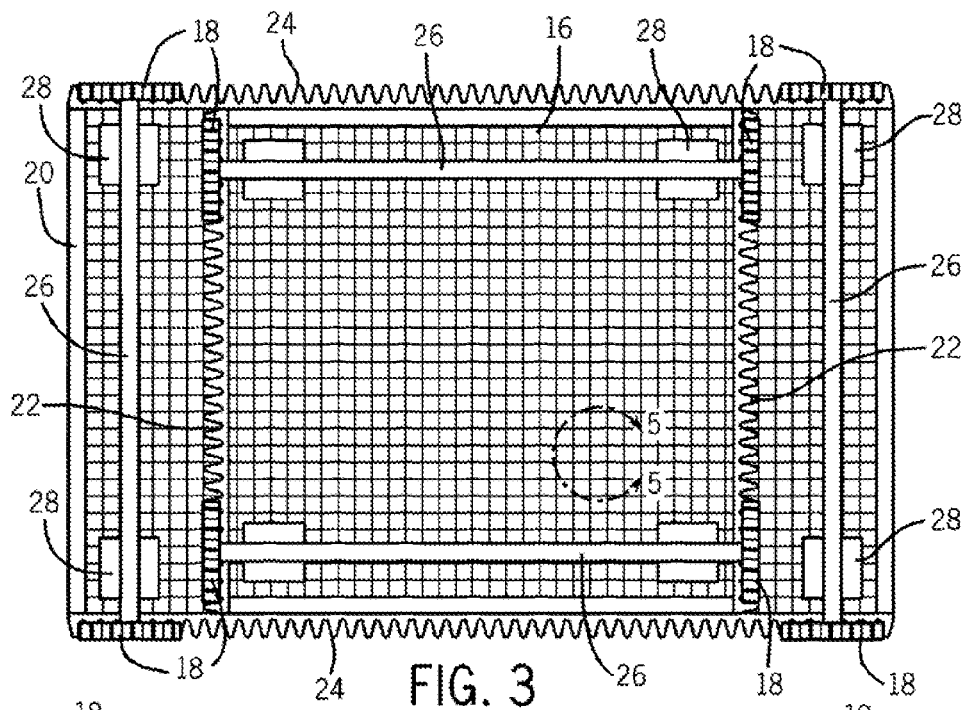
FIG. 3 is a plan view of the cat litter scoop of FIG. 1, with its cover removed.
Figure 4:
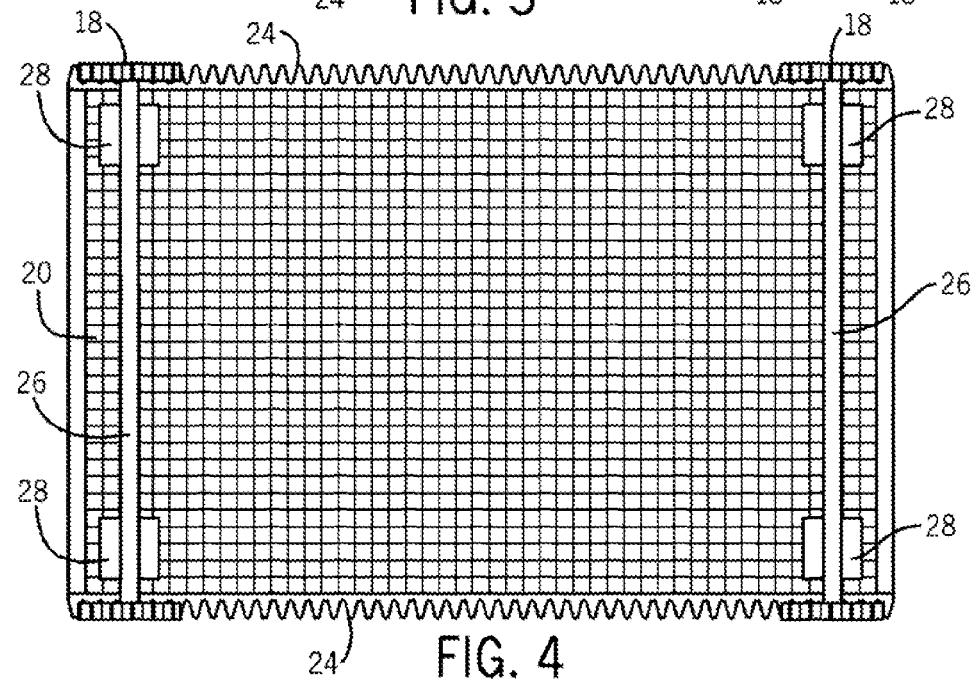
FIG. 4 is a plan view of the cat litter scoop of FIG. 1, with an upper screen unit removed.

While the FIGS. 5 and 6 show a square mesh design in the screen units 16, 20, other shapes may be possible. For example, round holes may be formed in one or more of the screen units 16, 20. In some embodiments, the rounded holes may allow clean litter granules to pass through while catching small clumps of litter.

A locking mechanism (not shown) may be disposed to retain the adjustable screens in a desired position. The locking mechanism may prevent or restrict the movement of the cogs 18. The locking mechanism may take various forms as would be known in the art. For example, a spring may be disposed to press the axles 26 against a rubber stopper (not shown). The user may press down on the cogs 18 to release the axles 26 from the rubber stopper, allowing movement of the cogs 18 to achieve a desired screen set position. When the user releases the cogs 18, the springs may act on the axles 26, causing the axles 26 to press against the rubber stopper, restricting movement of the cogs 18 from the set position. In other embodiments, a lever (not shown) may be disposed on the top cover 12 causing pads to secure or release the axles 26 and/or cogs 18. Alternatively, a set screw (not shown) may be used to secure screen units 16, 20 in in a desired position.

The various components of the litter scoop 10, including the top cover 12, the body 14, the upper and lower screen units 16, 20, the cog wheels 18, the axles 26, and the like, may be made from various materials, including plastic, metal, composite, and the like.

While the examples shown in the drawing move the upper screen unit 16 from front to back and the lower screen unit 20 from side to side, an opposite configuration may be possible. Furthermore, one of the screen units 16, 20 may be fixed while the other one of the screen units 16, 20 may be adjustable in both a forward and back direction and a side to side direction.

While the examples shown in the drawings use cogs 18, teeth 22, 24 and axles 26, for adjustment of the screen units 16, 20, other mechanisms may be used. For example, a lever may extend from the top cover 12, where adjustment of the lever may cause a pulley to turn. A belt may translate the pulley rotation to rotation of a cog which may engage the screen unit to move. Still other mechanisms for adjusting the position of the screen units may be contemplated within the scope of the present invention. For each of these mechanisms, various stops and locking mechanisms may be used to limit the movement of the screen units 16, 20 and to fix the position of the screen units into a desired position.

In some embodiments, instead of engaging with teeth 22, 24 on the sides of the screen units 16, 20, the cogs 18 may be designed to engage directly with the screen units 16, 20.

It should be understood, of course, that the foregoing relates to exemplary embodiments of the invention and that modifications may be made without departing from the spirit and scope of the invention as set forth in the following claims.

What is claimed is:

1. A scoop comprising:
   a scoop body;
   a first screen unit covering an opening in the scoop body, the first screen unit having a first mesh size; and
   a second screen unit disposed over the first screen unit, the second screen unit having a second mesh size, wherein the first screen unit is adjustable relative to the second screen unit;
   a combined mesh size is formed from the first screen unit and the second screen unit, wherein adjusting the first screen unit varies the combined mesh size, the combined mesh size selected to retain particles greater than a selected size;
   a top cover disposed on the body, the top cover securing the first and second screen units to the scoop body; and
   a first set of cog wheels extending through the top cover, wherein rotation of the first set of cog wheels affects movement of the first screen unit.

2. The scoop of claim 1, wherein the second screen unit is adjustable relative to the first screen unit.

3. The scoop of claim 2, wherein the first screen unit is adjustable from side to side of the scoop.

4. The scoop of claim 3, wherein the second screen unit is adjustable from front to back of the scoop.

5. The scoop of claim 1, further comprising a second set of cog wheels extending through the top cover, wherein rotation of the second set of cog wheels affects movement of the second screen unit.

6. The scoop of claim 5, further comprising teeth on opposite sides of the first screen unit and the second screen unit, wherein the first set of cog wheels engage the teeth on the first screen unit and the second set of cog wheels engage the teeth on the second screen unit.

7. A cat litter scoop comprising:
   a scoop body;
   a first screen unit covering an opening in the scoop body, the first screen unit movable in a first direction;
   a second screen unit disposed directly on top of the first screen unit, the second screen unit movable in a second direction, the second direction orthogonal to the first direction;
   a top cover adapted to retain the first screen unit and the second screen unit to the scoop body; and
   one or more adjustment mechanisms disposed on the top cover, wherein adjustment of the adjustment mechanisms causes movement of at least one of the first screen unit and the second screen unit.

8. A scoop comprising:
   a scoop body;
   a first screen unit covering an opening in the scoop body;
   a second screen unit disposed over the first screen unit;
   a top cover disposed on the body, the top cover securing the first and second screen units to the scoop body;
   a first set of cog wheels extending through the top cover, wherein rotation of the first set of cog wheels affects movement of the first screen unit;
   a second set of cog wheels extending through the top cover, wherein rotation of the second set of cog wheels affects movement of the second screen unit; and
   teeth on opposite sides of the first screen unit and the second screen unit, wherein the first set of cog wheels engage the teeth on the first screen unit and the second set of cog wheels engage the teeth on the second screen unit, wherein
   the first screen unit is adjustable relative to the second screen unit.

9. The scoop of claim 8, wherein the second screen unit is adjustable relative to the first screen unit.

10. The scoop of claim 9, wherein the first screen unit is adjustable from side to side of the scoop.

11. The scoop of claim 10, wherein the second screen unit is adjustable from front to back of the scoop.

* * * * *